United States Patent
Okuyama

(10) Patent No.: US 10,152,887 B2
(45) Date of Patent: Dec. 11, 2018

(54) ROUTE SEARCHING DEVICE AND ROUTE SEARCHING METHOD

(71) Applicant: Nissan Motor Co., Ltd., Yokohama-shi, Kanagawa (JP)

(72) Inventor: Takeshi Okuyama, Kanagawa (JP)

(*) Notice: Subject to any disclaimer, the term of this patent is extended or adjusted under 35 U.S.C. 154(b) by 0 days.

(21) Appl. No.: 15/747,420

(22) PCT Filed: Jul. 27, 2015

(86) PCT No.: PCT/JP2015/071219
§ 371 (c)(1),
(2) Date: Jan. 24, 2018

(87) PCT Pub. No.: WO2017/017756
PCT Pub. Date: Feb. 2, 2017

(65) Prior Publication Data
US 2018/0218602 A1    Aug. 2, 2018

(51) Int. Cl.
 G08G 1/0968    (2006.01)
 G01C 21/34    (2006.01)
 G08G 1/0967    (2006.01)
 G08G 1/0969    (2006.01)

(52) U.S. Cl.
 CPC ... *G08G 1/096844* (2013.01); *G01C 21/3492* (2013.01); *G08G 1/09675* (2013.01); *G08G 1/0969* (2013.01)

(58) Field of Classification Search
 CPC ......... G01C 21/3492; G08G 1/096844; G08G 1/09675; G08G 1/0969; G09B 29/10
 USPC .......................................... 701/411, 423, 425
 See application file for complete search history.

(56) References Cited

U.S. PATENT DOCUMENTS

| | | | |
|---|---|---|---|
| 7,930,095 B2 | 4/2011 | Lee | |
| 2008/0033632 A1 | 2/2008 | Lee | |
| 2009/0024320 A1 | 1/2009 | Nakamura et al. | |
| 2009/0248296 A1* | 10/2009 | Tomita | G01C 21/3461 701/465 |
| 2010/0198501 A1* | 8/2010 | Otani | G01C 21/3632 701/533 |

FOREIGN PATENT DOCUMENTS

| | | |
|---|---|---|
| JP | 2002250635 A | 9/2002 |
| JP | 2006105686 A | 4/2006 |
| JP | 2006266865 A | 10/2006 |
| KR | 20080014199 A | 2/2008 |

* cited by examiner

*Primary Examiner* — Gertrude Arthur Jeanglaude
(74) *Attorney, Agent, or Firm* — Young Basile Hanlon & MacFarlane, P.C.

(57) ABSTRACT

A route searching device extracts roads reaching a destination from a current position as candidate routes based on a predetermined condition, calculates a link cost of each of lanes in the candidate routes based on traffic information, and determines a lane-basis travel route based on the link costs of the respective lanes.

5 Claims, 3 Drawing Sheets

ROUTE SEARCHING DEVICE AND ROUTE SEARCHING METHOD

TECHNICAL FIELD

The present invention relates to a route searching device and a route searching method which search for a lane-basis travel route.

BACKGROUND

For a device configured to guide a vehicle over a specified route, there is proposed a technique in which roads to travel are specified and then a route to travel is specified from lanes of each of the specified roads (see Japanese Patent Application Publication No. 2006-266865). This can improve accuracy of route guidance while reducing the processing load of lane-basis route searching.

However, the technique described in Japanese Patent Application Publication No. 2006-266865 has the following problem. The device selects each road to travel by using a link cost and traffic jam information. Accordingly, unless the device selects each road including a lane optimal as the route, the device cannot specify an optimal route, even though it specifies a travel route from lanes in the selected road. For example, a road in which only one of multiple lanes is congested is determined to be a congested road and is not selected as the road for specifying the travel route.

SUMMARY

In view of the problem described above, an object of the present invention is to provide a route searching device and a route searching method which can improve efficiency and accuracy of lane-basis route searching.

A route searching device calculates road-basis link costs of routes reaching a destination from a current position, extracts road-basis candidate routes having the road-basis link costs equal to or less than a predetermined threshold, and calculate lane-basis link costs of each of the candidate routes based on the traffic information and determine a lane-basis travel route based on the lane-basis link costs. The route searching device extracts a route with a shortest distance, a route with a shortest required time not considering the traffic information, and a route with a shortest required time considering the traffic information, as the candidate routes with the predetermined condition. The present invention can provide a route searching device and a route searching method which can improve the efficiency and accuracy of lane-basis route searching by selecting the lane-basis travel route from the plurality of road-basis candidate routes.

DETAILED DESCRIPTION OF THE EMBODIMENTS

Figure 1:
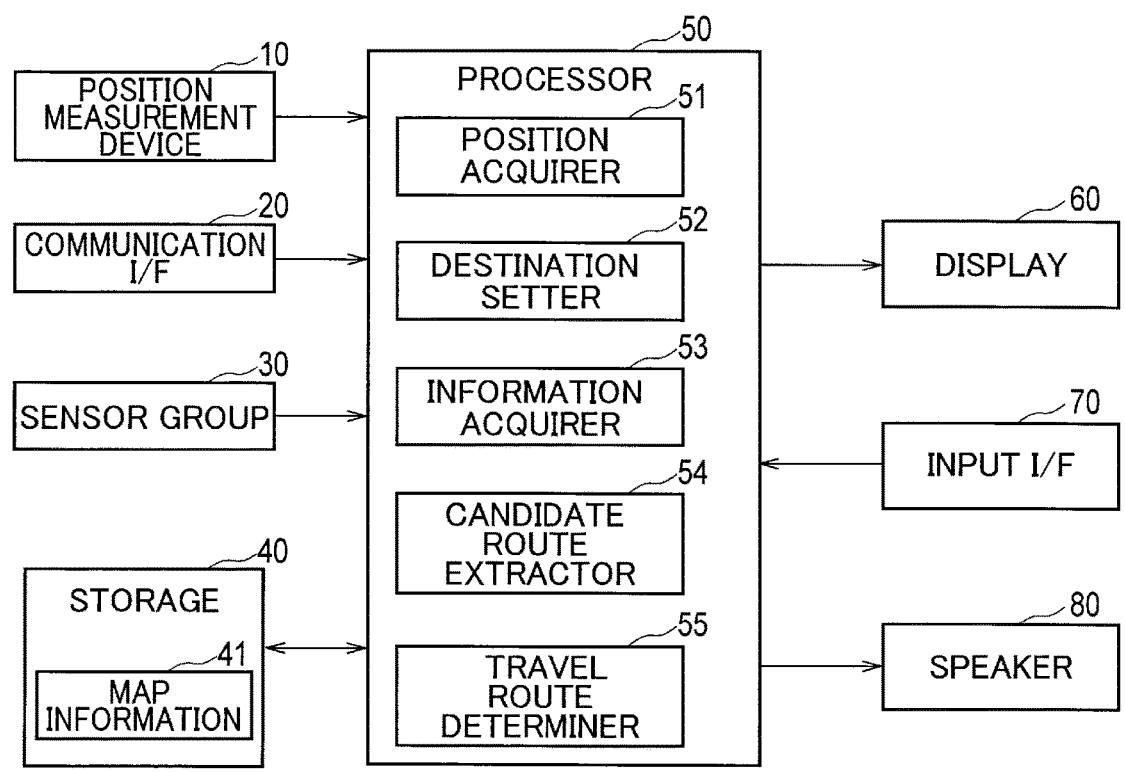
FIG. 1 is a block diagram explaining an example of a configuration of a route searching device according to an embodiment of the present invention.

An embodiment of the present invention is described with reference to the drawings. In the description of the drawings, the same or similar parts are denoted by the same or similar reference numerals and overlapping description is omitted.

(Route Searching Device)

As illustrated in FIG. 1, a route searching device according to the embodiment includes a position measurement device 10, a communication interface (I/F) 20, a sensor group 30, a storage 40, a processor 50, a display 60, an input I/F 70, and a speaker 80. For example, the route searching device according to the embodiment of the present invention is mounted in a vehicle V (see FIG. 3) and searches for a lane-basis travel route.

The position measurement device 10 measures a current position by using a positioning system such as a global positioning system (GPS). The position measurement device 10 includes, for example, a GPS receiver. The position measurement device 10 outputs the measured current position to the processor 50 time after time.

The communication I/F 20 is, for example, a communication unit which wirelessly exchanges signals with outside. The communication I/F 20 can receive, for example, traffic information on each of various lanes from the outside by using an intelligent transport system (ITS) which sends traffic information such as traffic jam information, traffic control information, and warning information, weather information, and the like in real time. The ITS include VICS (Vehicle Information and Communication System: registered trademark), telematics, and the like. The communication I/F 20 outputs the received information to the processor 50 time after time.

The sensor group 30 can be configured by a speed sensor, an acceleration sensor, an angular speed sensor, a steering angle sensor, and the like. The sensor group 30 detects the speed of the vehicle V, the three-axis acceleration and angular speed of the vehicle V in a three-dimensional Cartesian coordinate system, and the like by using the sensors, and outputs the detection results to the processor 50 time after time. The sensor group 30 may include an image sensor which captures an image around the vehicle V, a distance sensor such as a laser range finder (LRF) which detects the distance from the vehicle V to a target and the direction in which the target is present, a bearing sensor which detects the bearing of the vehicle V, and the like.

The storage 40 stores map information 41 including lanes in each road. The storage 40 can be configured by a semiconductor memory, a magnetic disk, or the like. The storage 40 may include information on features present around the roads. The storage 40 may also store programs necessary for processing performed by the processor 50. The storage 40 may be configured by one piece of hardware or by multiple pieces of hardware.

The processor 50 includes a position acquirer 51, a destination setter 52, an information acquirer 53, a candidate route extractor 54, and a travel route determiner 55. The processor 50 can be configured by, for example, a microcontroller which is an integrated circuit including a central processing unit (CPU), a memory, an input/output I/F, and the like. In this case, the multiple information processors (51 to 55) configuring the processor 50 are implemented by the CPU executing a computer program installed in advance in the microcontroller. Parts configuring the processor 50 may be configured by an integral piece of hardware or separate pieces of hardware. The microcontroller may serve also as, for example, an electronic control unit (ECU) used for other control associated with the vehicle V such as automatic driving control.

The display 60 displays images and characters according to control by the processor 50 to present various pieces of information to an occupant of the vehicle V. The display 60 is formed of, for example, a display such as a liquid-crystal display. The display 60 displays a map of an area around the vehicle V which includes roads recorded in the map information 41 and lanes in each road, according to the control of the processor 50.

The input I/F 70, for example, receives operations performed by the occupant and outputs signals corresponding to the operations to the processor 50. The operations performed on the input I/F 70 may be performed by voice. The display 60 and the input I/F 70 may be integrally formed as a touch panel display. The speaker 80 regenerates voices and sounds according to the control by the processor 50 to present various pieces of information to the occupant of vehicle V.

(Route Searching Method)

Figure 2:
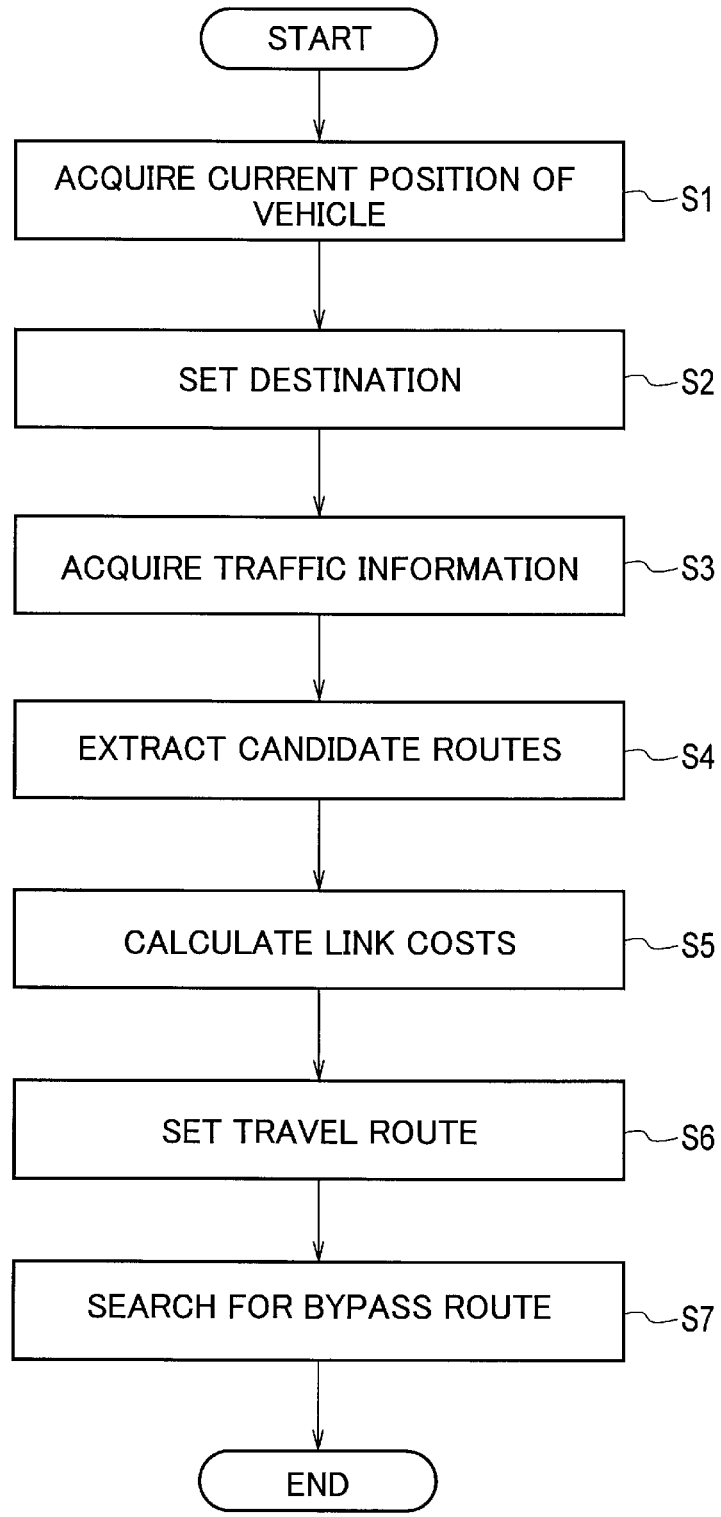
FIG. 2 is a flowchart explaining a route searching method performed by the route searching device according to an embodiment of the present invention.

An example of operations of a route searching device according to the embodiment is described with reference to the flowchart of FIG. 2.

In step S1, the position acquirer 51 acquires the current position of the vehicle V in the map information 41 based on the current position which is measured by the position measurement device 10 and on the movement amount of the vehicle V and the position of the vehicle V relative to the features which are detected by the sensor group 30.

In step S2, the destination setter 52 sets a destination to be reached by the vehicle V in the map information 41, based on, for example, the operation performed by the occupant on the input I/F 70.

In step S3, the information acquirer 53 acquires the traffic information on each lane around the vehicle V from the communication I/F 20. The traffic information on each lane is, for example, the traffic jam information indicating traffic jam and congestion, the traffic control information indicating traffic control, and the like.

In step S4, the candidate route extractor 54 extracts multiple road-basis candidate routes from the map information 41 based on predetermined conditions, the candidate routes each reaching the destination set by the destination setter 52 from the current position of the vehicle V obtained by the position acquirer 51. For example, the candidate route extractor 54 calculates road-basis link costs of routes reaching the destination from the current position, and extracts the candidate routes based on the link costs. The time required to travel over the route, fuel consumption, toll, distance, and the like may be used as the road-basis link costs. The link costs are calculated based on the type of the road, the traffic information, the type of the vehicle, and the like.

For example, the candidate route extractor 54 extracts a road with the shortest travel distance, a road with the shortest travel time not considering the traffic information, and a road with the shortest travel time considering the traffic information, from the map information 41, as three candidate routes. Moreover, the candidate route extractor 54 may extract, in addition to the road with the lowest link cost, multiple roads whose link costs are equal to or less than a predetermined threshold, as the candidate routes.

In step S5, the travel route determiner 55 calculates the lane-basis link cost of each of the candidate routes extracted by the candidate route extractor 54, based on the map information 41 and the traffic information. The lane-basis link cost is, for example, the time required to travel over the route.

In step S6, the travel route determiner 55 selects the lane-basis travel route from the candidate routes extracted by the candidate route extractor 54, based on the lane-basis link costs calculated in step S5. For example, the travel route determiner 55 determines the candidate route with the lowest link cost as the travel route.

In step S7, when the travel route determined in step S6 includes a traffic jam section indicated by the traffic information, the travel route determiner 55 searches for a bypass route which bypasses the traffic jam section. The travel route determiner 55 calculates the lane-basis link cost of each bypass route searched for and compares the calculated link cost with the link cost of the travel route determined in step S6. When there is a bypass route whose link cost is lower than that of the travel route determined in step S6, the travel route determiner 55 may determine the bypass route with the lowest link cost as the final travel route.

Figure 3:
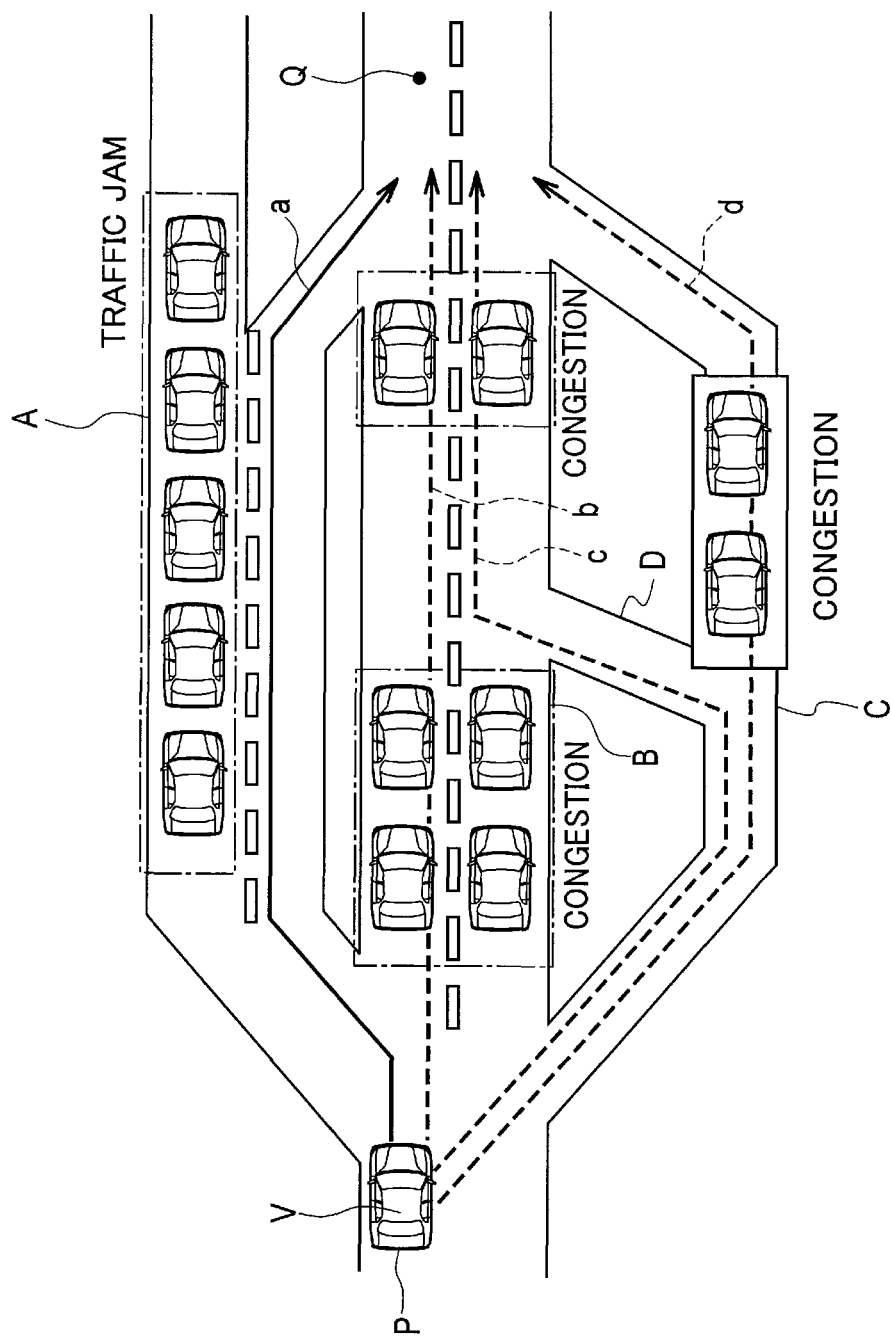
FIG. 3 is a view explaining an operation of the route searching device according to the embodiment of the present invention.

For example, as illustrated in FIG. 3, assume that the candidate route extractor 54 extracts four road-basis candidate routes a to d, for a current position P of the vehicle V acquired by the position acquirer 51 and a destination Q set by the destination setter 52. The candidate route a is a route which branches off from a road B on which the vehicle V is traveling to a road A and then merges with the road B again. The candidate route b is the road B. The candidate route c is a route which branches off from the road B to the road C and then merges with the road B via a road D. The candidate route d is a route which branches off from the road B to the road C and then merges with the road B again.

In this case, the travel route determiner 55 calculates the link cost of each of lanes included in the candidate routes a to d, and determines a route along a right lane of the road A with the lowest link cost in the candidate route a, as the travel route. For example, the travel route determiner 55 may calculate the lane-basis link costs only for sections indicated by the traffic jam information in the candidate routes.

Generally, the road A including a lane which is congested and a lane which is not congested is considered simply as a congested road, and is not selected as the optimal path. The candidate route c is thus likely to be determined as the optimal route.

Meanwhile, since the route searching device according to the embodiment of the present invention extracts multiple candidate routes based the predetermined conditions, the route searching device can accurately search for the optimal route by calculating the lane-basis link cost of each candidate route. Moreover, since the route searching device according to the embodiment of the present invention extracts multiple road-basis candidate routes and then calculates the lane-basis link costs of the respective candidate routes, the route searching device can prevent the processing load of the lane-basis route searching from becoming large and efficiently search for the optimal travel route.

As described above, the route searching device according to the embodiment of the present invention calculates the lane-basis link costs of the multiple road-basis candidate routes and selects the lane-basis travel route from the multiple candidate routes. Hence, the route searching device according to the embodiment of the present invention can improve efficiency and accuracy of the lane-basis route searching.

Moreover, when any of the candidate routes includes the traffic jam section, the route searching device according to the embodiment of the present invention calculates the lane-basis link cost only for the traffic jam section. The route searching device according to the embodiment of the present invention can thereby reduce the processing load in the route searching.

Furthermore, when the travel route includes the traffic jam section, the route searching device according to the embodiment of the present invention searches for a bypass route bypassing the traffic jam section. Accordingly, when the determined travel route includes the traffic jam section, the route searching device according to the embodiment of the present invention can search for the travel route which is more optimal.

Moreover, the route searching device according to the embodiment of the present invention extracts the route with the shortest travel distance, the route with the shortest travel time not considering the traffic information, and the route with the shortest travel time considering the traffic information, as multiple candidate routes. The route searching device according to the embodiment of the present invention can thus reduce the possibility of the optimal route being excluded from the candidate routes, in cases such as where the routes with the shortest required time not considering the distance and the traffic jam information all include the traffic jam section.

Moreover, in the route searching device according to the embodiment of the present invention, the degree of contribution of the traffic information to the road-basis link costs used for the extraction of the candidate routes is lower than the degree of contribution of the traffic information to the lane-basis link costs used for the determination of the travel route. The route searching device according to the embodiment of the present invention can thus reduce the possibility of the optimal route being excluded from the candidate routes, in cases such as where the routes with the shortest required time not considering the distance and the traffic jam information all include the traffic jam section.

(Other Embodiments)

Although the present invention has been described above by using the aforementioned embodiment, it should not be understood that the description and drawings forming part of this disclosure limit the present invention. From this disclosure, various alternative embodiments, examples, and operations techniques will be found by those skilled in the art.

For example, in the embodiment described above, the current position of the vehicle V is not limited to the current position obtained by using the position measurement device 10 and the sensor group 30. The position acquirer 51 may acquire, as the current position, a start point which is set like the destination at a location different from the current position.

Moreover, the present invention includes various embodiments and the like which are not described herein such as configurations mutually adopting the aforementioned configurations, as a matter of course. Accordingly, the technical scope of the present invention should be determined only by the matters specifying the invention in the scope of claims regarded as appropriate based on the aforementioned description.

Furthermore, the functions described in the embodiment of the present invention can be executed by one or multiple processing circuits. The processing circuit includes a programed processing device such as a processing device including an electric circuit. The processing circuit may include devices such as circuit components and an application specific integrated circuit (ASIC) designed to execute the described functions.

The present invention can provide the route searching device and the route searching method which can improve the efficiency and accuracy of the lane-basis route searching by selecting the lane-basis travel route from the multiple road-basis candidate routes.

REFERENCE SIGNS LIST

40 storage
41 map information
51 position acquirer
52 destination setter
53 information acquirer
54 candidate route extractor
55 travel route determiner

The invention claimed is:

1. A route searching device comprising:
   a storage configured to store map information including lanes in each of roads;
   a position acquirer configured to acquire a current position of a vehicle in the map information;
   a destination setter configured to set a destination of the vehicle in the map information;
   an information acquirer configured to acquire traffic information on each of the lanes;
   a candidate route extractor configured to calculate road-basis link costs of routes reaching the destination from the current position based on a predetermined condition and extract road-basis candidate routes having the road-basis link costs equal to or less than a predetermined threshold from the map information; and
   a travel route determiner configured to calculate lane-basis link costs of each of the candidate routes based on the traffic information and determine a lane-basis travel route based on the lane-basis link costs,
   wherein the candidate route extractor extracts a route with a shortest distance, a route with a shortest required time not considering the traffic information, and a route with a shortest required time considering the traffic information, as the candidate routes with the predetermined condition based on the road-basis link costs.

2. The route searching device according to claim 1, wherein, upon any of the candidate routes including a traffic jam section indicated by the traffic information, the travel route determiner calculates the lane-basis link cost of only the traffic jam section.

3. The route searching device according to claim 1, wherein, upon the travel route including a traffic jam section indicated by the traffic information, the travel route determiner searches for a bypass route bypassing the traffic jam section.

4. The route searching device according to claim 1, wherein
   the candidate route extractor calculates, as the predetermined condition, road-basis link costs of the routes reaching the destination from the current position based on the traffic information and extracts the candidate routes based on the road-basis link costs, and
   a degree of contribution of the traffic information to the road-basis link costs is lower than a degree of contribution of the traffic information to the lane-basis link costs.

5. A route searching method, comprising
   acquiring a current position of a vehicle in map information including lanes of each of roads;
   setting a destination of the vehicle in the map information;
   acquiring traffic information on each of the lanes;
   calculating road-basis link costs of routes reaching the destination from the current position based on a predetermined condition and extracting road-basis candidate routes having the road-basis link costs equal to or less than a predetermined threshold from the map information; and
   calculating lane-basis link costs of each of the candidate routes based on the traffic information and determining a lane-basis travel route based on the lane-basis link costs, wherein a route with a shortest distance, a route with a shortest required time not considering the traffic information, and a route with a shortest required time considering the traffic information are extracted as the candidate routes with the predetermined condition based on the road-basis link costs.

* * * * *